(12) United States Patent
Lim et al.

(10) Patent No.: US 11,474,320 B2
(45) Date of Patent: Oct. 18, 2022

(54) LENS ASSEMBLY

(71) Applicant: MICRO ACTUATOR CO., LTD., Gyeonggi-do (KR)

(72) Inventors: Dae Soon Lim, Gyeonggi-do (KR); Hak Ku Yoon, Gyeonggi-do (KR); Myung Won Choi, Gyeonggi-do (KR); Dong Sung Lee, Gyeonggi-do (KR)

(73) Assignee: MICRO ACTUATOR CO., LTD., Gyeonggi-Do (KR)

( * ) Notice: Subject to any disclaimer, the term of this patent is extended or adjusted under 35 U.S.C. 154(b) by 370 days.

(21) Appl. No.: 16/648,928

(22) PCT Filed: Jun. 3, 2019

(86) PCT No.: PCT/KR2019/006666
§ 371 (c)(1),
(2) Date: Mar. 19, 2020

(87) PCT Pub. No.: WO2020/153543
PCT Pub. Date: Jul. 30, 2020

(65) Prior Publication Data
US 2021/0215902 A1    Jul. 15, 2021

(30) Foreign Application Priority Data

Jan. 25, 2019   (KR) .................. 10-2019-0009870
Mar. 7, 2019    (KR) .................. 10-2019-0026422

(51) Int. Cl.
*G02B 7/02*    (2021.01)
*G02B 27/64*   (2006.01)
(Continued)

(52) U.S. Cl.
CPC ............ *G02B 7/02* (2013.01); *G02B 27/646* (2013.01); *B29D 11/00009* (2013.01); *B29K 2021/003* (2013.01); *G02B 7/09* (2013.01)

(58) Field of Classification Search
None
See application file for complete search history.

(56) References Cited

U.S. PATENT DOCUMENTS 7,630,619 B2    12/2009  Masuda
8,749,643 B2     6/2014  Lim et al.

FOREIGN PATENT DOCUMENTS

JP     2007-199388 A      8/2007
KR       100798865    *  12/2006  ........... H04N 5/2254
(Continued)

OTHER PUBLICATIONS

Office Action issued in Korean Patent Application No. 10-2019-0026422; dated Jan. 17, 2020; 11 pages, including English translation.
(Continued)

*Primary Examiner* — Darryl J Collins
*Assistant Examiner* — Tamara Y. Washington
(74) *Attorney, Agent, or Firm* — Ulmer & Berne LLP

(57) ABSTRACT

The disclosure relates to a micro lens assembly including; a base; a support inserted into the base to be movable in an optical axis direction; a driver for auto focus adjustment configured to move the support in the optical axis direction; a lens unit inserted into the support and including a lens barrel to which a lens part is coupled; a driver for optical image stabilization configured to move the lens unit in the direction perpendicular to the optical axis direction; a plurality of ball bearings arranged between the support and the base for the support to be movable with respect to the base in the optical axis direction; and a plurality of connection members configured to connect the lens unit and the support to each other for the lens unit to be movable with respect to the support and formed of an elastic nonconductor.

9 Claims, 13 Drawing Sheets

(51) Int. Cl.
  *B29D 11/00*    (2006.01)
  *B29K 21/00*    (2006.01)
  *G02B 7/09*     (2021.01)

(56) References Cited

FOREIGN PATENT DOCUMENTS

| KR | 10-1068124 B1     | 9/2011  |
|----|-------------------|---------|
| KR | 10-2012-0099945 A | 9/2012  |
| KR | 10-2014-0084971 A | 7/2014  |
| KR | 10-2015-0104388 A | 9/2015  |
| KR | 10-1910838 B1     | 10/2018 |
| KR | 10-1930042 B1     | 12/2018 |

OTHER PUBLICATIONS

International Search Report and Written Opinion of the International Searching Authority, issued in International Application No. PCT/KR2019/006666; dated Oct. 18, 2019; 15 pages, including English translations.

Notice of Allowance issued in Korean Patent Application No. 10-2019-0026422; dated Jul. 15, 2020; 7 pages, including partial English translation.

\* cited by examiner

LENS ASSEMBLY

TECHNICAL FIELD

Apparatuses and methods consistent with the disclosure relate to a lens assembly, and more particularly, to a micro lens assembly having an auto focus function and an optical image stabilizing function.

BACKGROUND ART

In general, lens assemblies are being increasingly small-sized with the development of technology, and are being manufactured to perform an auto focus function or to perform an optical image stabilizing function together with the auto focus function so as to obtain high-quality captured images.

The auto focus is a function to automatically focus on a specific object by moving a lens forwardly or backwardly. In addition, the optical image stabilization (OIS) is a function enabling the lens to detect shaking of a small electronic device (e.g., a smart phone) through a gyro sensor and to be finely moved in a direction opposite to the movement of the small electronic device so as to correct a focus. The direction in which the lens is moved for the optical image stabilization is perpendicular to that in which the lens is moved for the auto focus.

According to the growing trend towards making small electronic devices to be light and compact, a lot of researches and developments are being carried out for the lens assemblies to be more micro-sized while maintaining their functions.

DISCLOSURE

Technical Problem

The disclosure provides a micro lens assembly having an auto focus function and an optical image stabilizing function.

Technical Solution

According to an embodiment of the disclosure, a lens assembly includes: a base; a support inserted into the base to be movable in an optical axis direction; a driver for auto focus adjustment configured to move the support in the optical axis direction; a lens unit inserted into the support to be movable in a direction perpendicular to the optical axis direction and including a lens barrel to which a lens part is coupled; a driver for optical image stabilization configured to move the lens unit in the direction perpendicular to the optical axis direction; a plurality of ball bearings arranged between the support and the base for the support to be movable with respect to the base in the optical axis direction; and a plurality of connection members configured to connect the lens unit and the support to each other for the lens unit to be movable with respect to the support, and formed of an elastic nonconductor.

Each of the plurality of connection members may have one end fixed to the support and the other end fixed to the lens unit, and each of the plurality of connection members may include at least two bendable portions.

The plurality of connection members may be formed by injection-molding a synthetic resin material. A material of the plurality of connection members may be a thermoplastic elastomer (TPE).

The plurality of connection members may include first to fourth connection members. One ends of the first to fourth connection members may be coupled to first to fourth coupling grooves formed at four corner portions of the support, respectively, the other ends of the first to fourth connection members may be coupled to fifth to eighth coupling grooves formed at four corner portions of the lens unit, respectively, and pillar portions of the first to fourth connection members are disposed between the one ends and the other ends.

Each of the first to fourth connection members may include: a first connection portion located at a portion where the one end and the pillar portion are connected to each other; and a second connection portion located at a portion where the other end and the pillar portion are connected to each other, the first and second connection portions being formed to be thinner than the pillar portion to serve as hinges.

The one ends of the first to fourth connection members may be fixed to the first to fourth coupling grooves, respectively, by an adhesive, and the other ends of the fifth to eighth connection members may be fixed to the fifth to eighth coupling grooves, respectively, by an adhesive.

The one ends of the first to fourth connection members may include coupled portions pressed against and coupled to the first to fourth coupling grooves, respectively, and the other ends of the fifth to eighth connection members may include coupled portions pressed against and coupled to the fifth to eighth coupling grooves, respectively.

The pillar portion may be formed to be gradually thicker from both ends toward a middle portion thereof. In this case, the pillar portion may have an elliptical longitudinal section.

Advantageous Effects

According to the disclosure, the lens unit can be movably supported by the plurality of connection members having a simple structure with improved durability, thereby increasing product reliability.

BEST MODE FOR CARRYING OUT THE INVENTION

Figure 1:
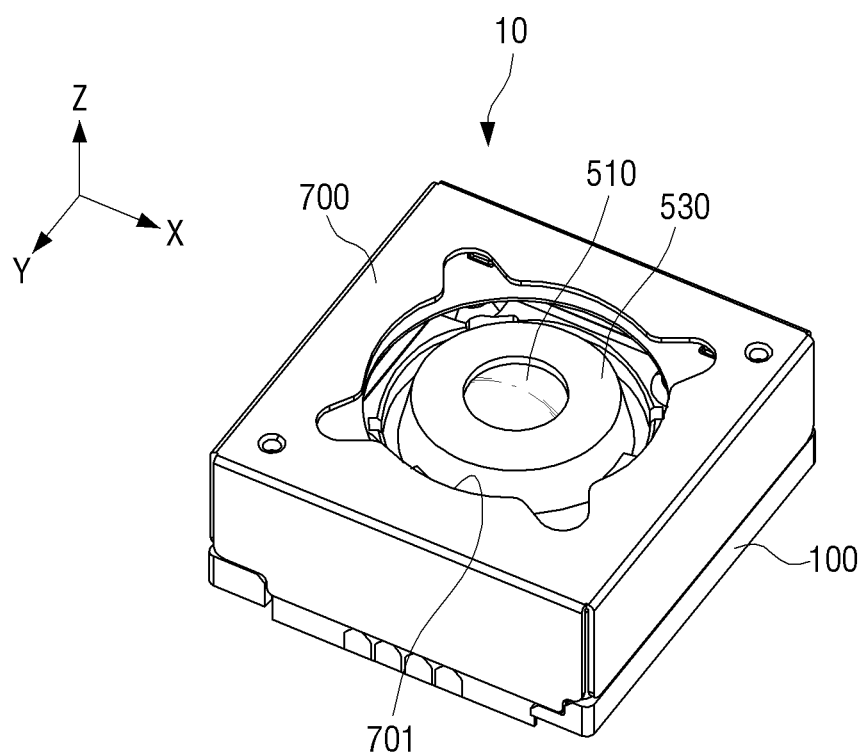
FIG. 1 is an assembled perspective view illustrating a micro lens assembly according to an embodiment of the disclosure.

Hereinafter, various embodiments of the disclosure will be described in more detail with reference to the accompanying drawings. The embodiments described in the specification may be variously modified. Specific embodiments may be illustrated in the drawings and described in detail in the detailed description. It should be understood, however, that the specific embodiments disclosed in the accompanying drawings are only intended to facilitate an understanding of the various embodiments of the disclosure. Therefore, it is to be understood that the technical idea of the disclosure is not limited by the specific embodiments disclosed in the accompanying drawings, but the disclosure should be understood to include all equivalents or alternatives included in the spirit and technical scope of the disclosure.

Terms including ordinals, such as "first" and "second", may be used to describe various elements, but the elements are not limited by the terms. The terms are used only for the purpose of distinguishing one element from another element.

It should be understood that terms "include", "have", and the like in the specification are used to specify the presence of features, numbers, steps, operations, elements, parts, or combinations thereof described in the specification, but do not preclude the presence or addition of one or more other features, numbers, steps, operations, elements, parts, or combinations thereof. It is to be understood that when an element is referred to as being "connected" or "coupled" to another element, it may be directly connected or coupled to the other element, but intervening elements may be present therebetween. Meanwhile, when an element is referred to as being "directly connected" or "directly coupled" to another element, it should be understood that there are no intervening elements present therebetween.

In addition, in the following description of the disclosure, when it is determined that a detailed description of a related known function or configuration may unnecessarily obscure the subject matter of the disclosure, the detailed description thereof will be abridged or omitted.

A micro lens assembly according to an embodiment of the disclosure may be installed in a small electronic device such as a smart phone for use in capturing an image.

Hereinafter, a micro lens assembly according to an embodiment of the disclosure will be described with reference to the accompanying drawings.

Figure 2:
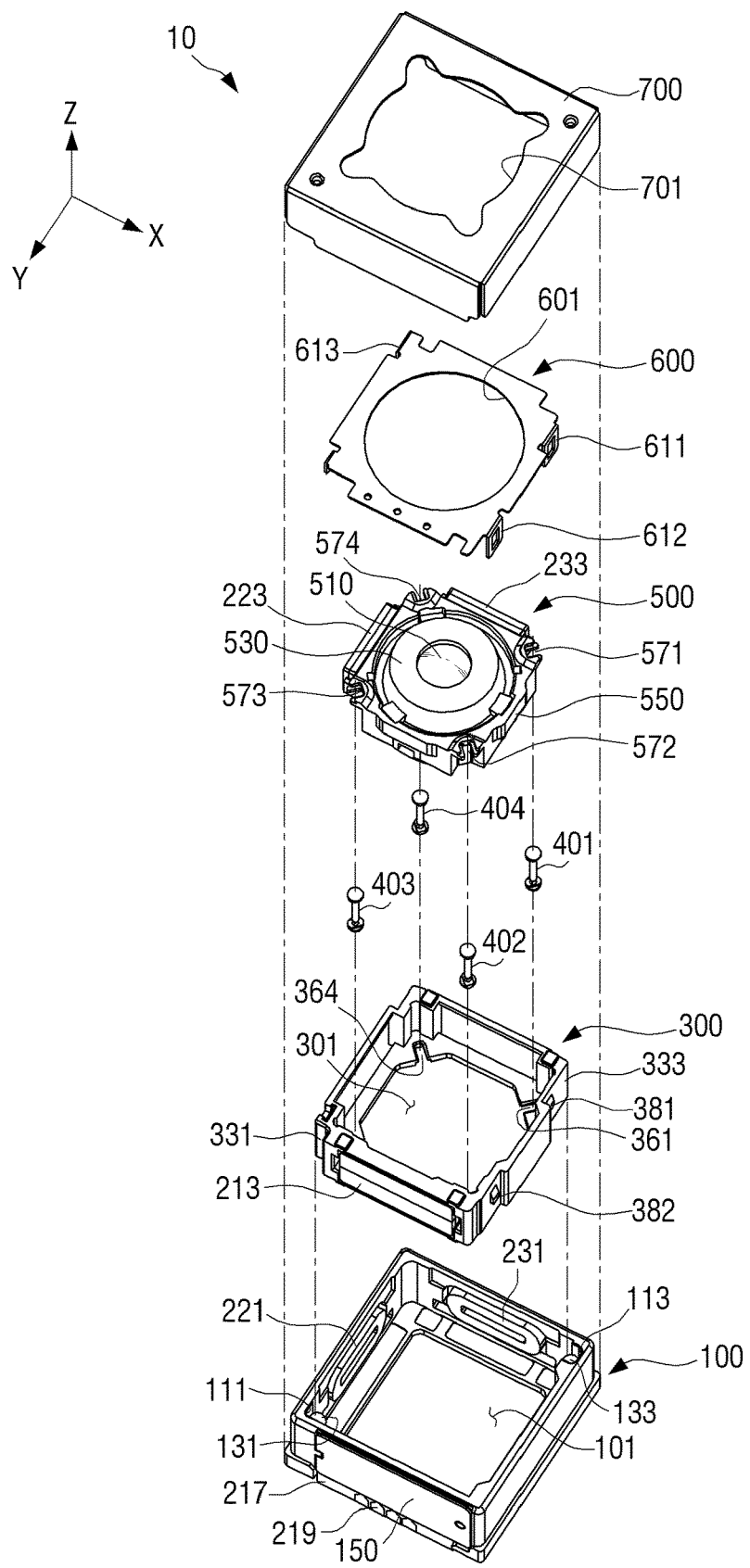
FIGS. 2 and 3 are exploded perspective views illustrating the micro lens assembly according to an embodiment of the disclosure.
Figure 3:
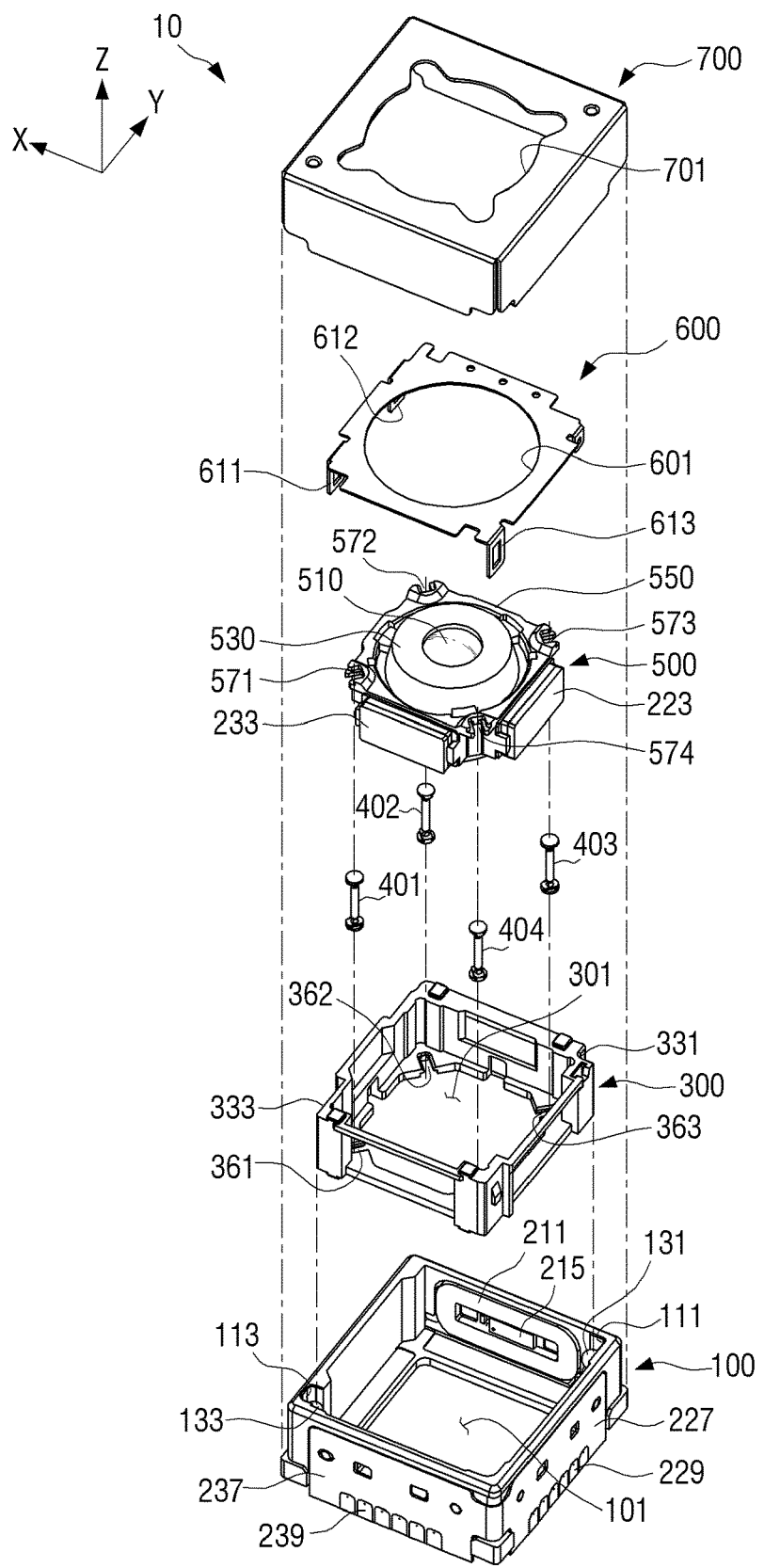

FIG. 1 is an assembled perspective view illustrating a micro lens assembly according to an embodiment of the disclosure, FIGS. 2 and 3 are exploded perspective views illustrating the micro lens assembly according to an embodiment of the disclosure.

Referring to FIGS. 1 to 3, the micro lens assembly 10 according to an embodiment of the disclosure may include: a base 100; a support 300 moving a lens part 510 along a Z-axis direction for auto focus adjustment; a lens unit 500 moving the lens part 510 along an X-Y plane for optical image stabilization; a plurality of connection members 401, 402, 403 and 404 connecting the support 300 and the lens unit 500 for the lens unit 500 to be movable with respect to the support 300; an inner cover 600 for preventing the lens unit 500 from escaping from the support 300; and an outer cover 700 covering the base 100.

Figure 4:
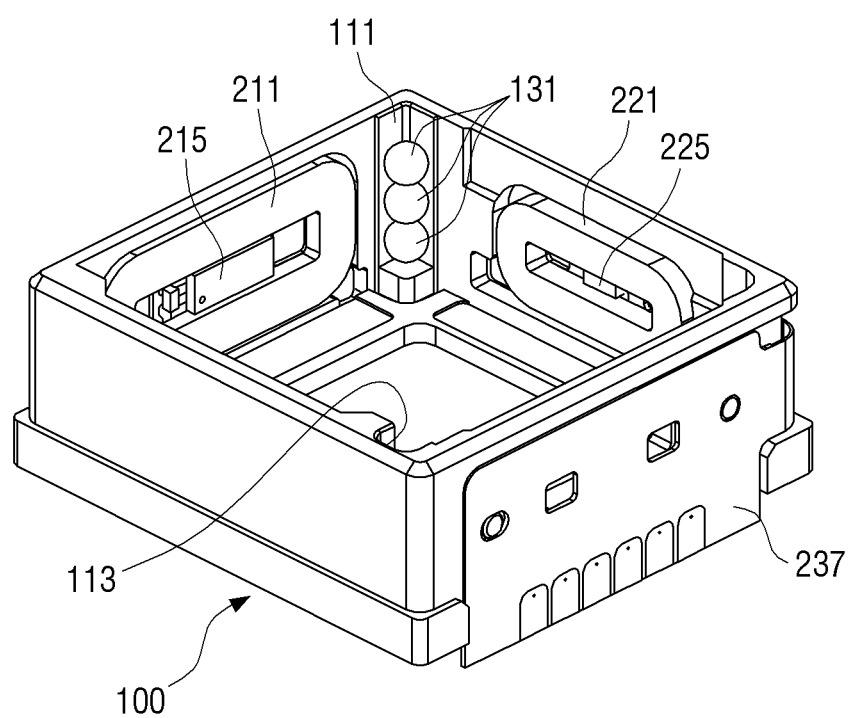
FIGS. 4 and 5 are perspective views illustrating a base.
Figure 5:
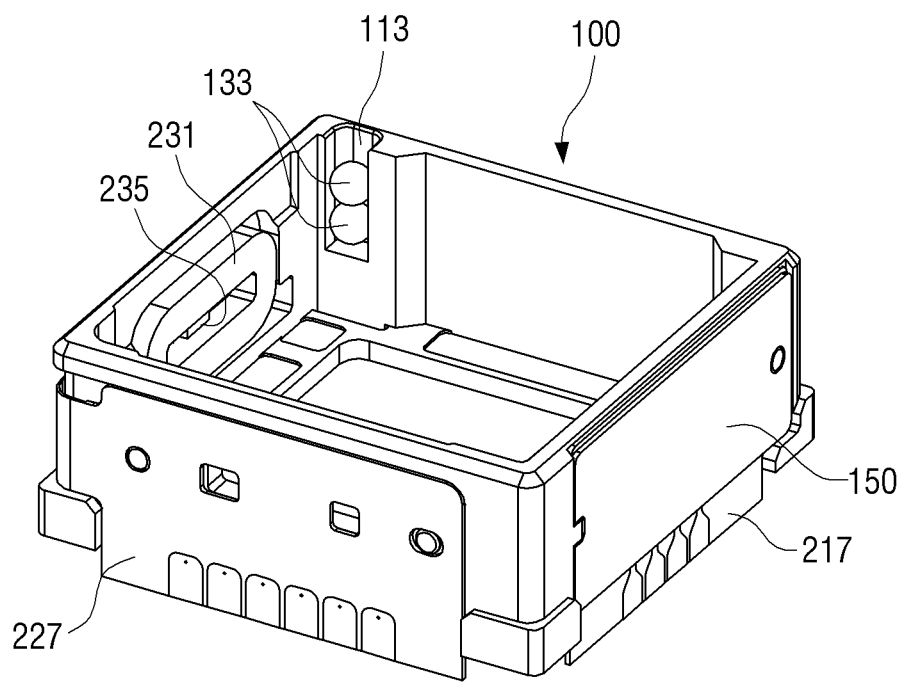
Figure 6:
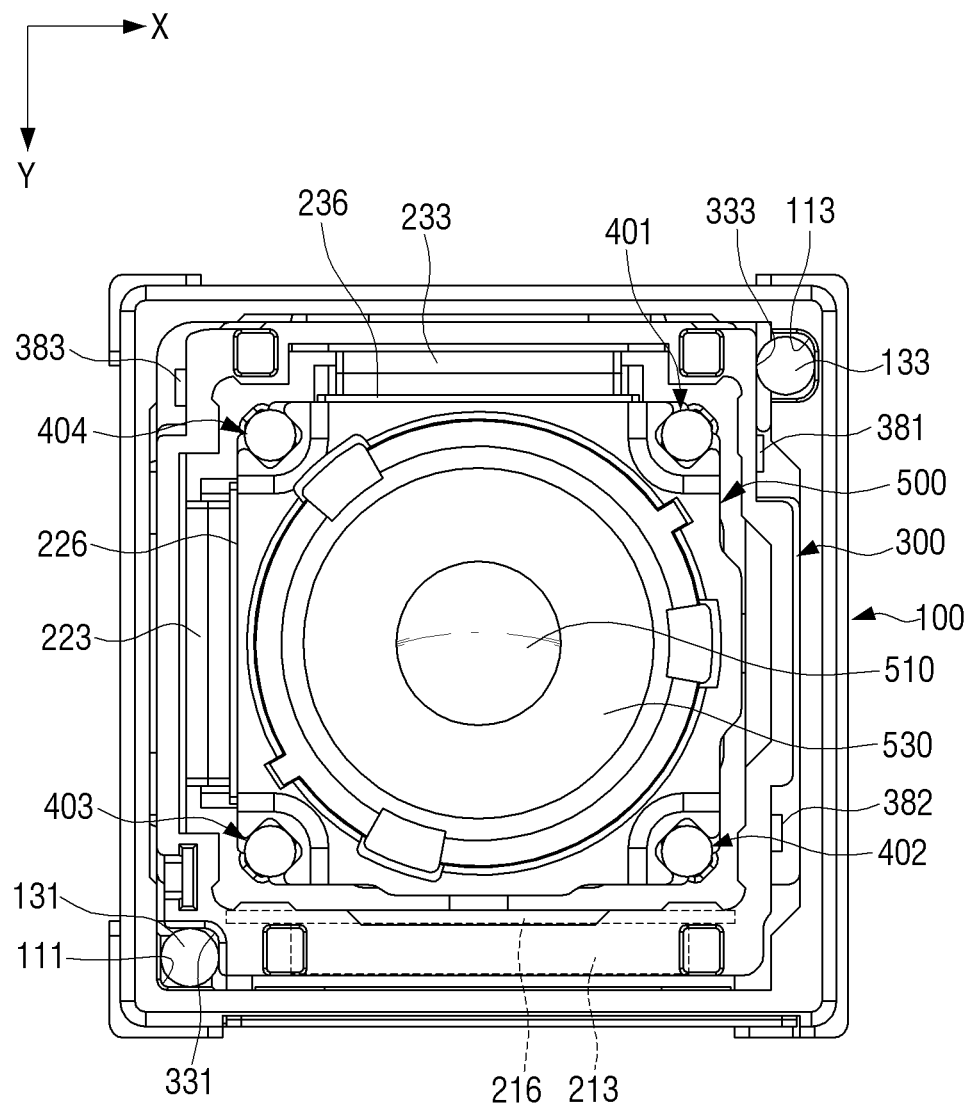
FIG. 6 is a plan view illustrating the base, a support, and a lens unit in an assembled state.

FIGS. 4 and 5 are perspective views illustrating the base, and FIG. 6 is a plan view illustrating the base, the support, and the lens unit in an assembled state.

Referring to FIGS. 4 to 6, the base 100 may be installed in an area of a small electronic device (not shown), and a printed circuit board (not shown) on which an image sensor (not shown) is mounted may be disposed under the base 100. The base 100 has a predetermined space inside for the support 300 to be moved along the Z-axis direction, and has a first light passage hole 101 formed through the bottom thereof. The light passing through the lens unit 500 is irradiated to the image sensor located under the base 100 through the first light passage hole 101 formed in the base 100.

The base 100 may be formed as a generally rectangular parallelepiped shape. Besides the rectangular parallelepiped shape, the shape of the base 100 may be appropriately changed according to the size and shape of the small electronic device in which the lens assembly 10 is installed.

Referring to FIG. 6, a first plurality of ball bearings 131 and a second plurality of ball bearings 133 for guiding the support 300 in the Z-axis direction with respect to the base 100 may be disposed between the base 100 and the support 300.

The base 100 and the support 300 are kept at a predetermined distance by the first and second plurality of ball bearings 131 and 133. Accordingly, the support 300 may be moved smoothly in the Z-axis direction without friction with an inner side of the base 100.

The first plurality of ball bearings 131 and the second plurality of ball bearings 133 may be arranged in a diagonal direction. That is, the first plurality of ball bearings 131 are located at one corner of the base 100, and the second plurality of ball bearings 133 are located at another corner of the base 100 facing the one corner of the base 100 in relation to the lens part 510.

The first plurality of ball bearings 131 are each arranged in a guided state by a first guide groove 111 formed at an inner corner of the base 100 and a second guide groove 331 formed at an outer corner of the support 300 facing the first guide groove 111. In this case, the first plurality of ball bearings 131 may be arranged in a line along the Z-axis direction while being in contact with both the first and second guide grooves 111 and 331. The first guide groove 111 of the base 100 may be formed at a position adjacent to one side of a first coil 211.

The second plurality of ball bearings 133 may be inserted into a third guide groove 113 formed at an inner corner of the base 100 located in a direction diagonal to the first guide groove 111. In this case, the second plurality of ball bearings 133 may be supported by a guide surface 333 that is a part of an outer corner of the support 300 located in a direction generally diagonal to the second guide groove 331. In this case, the second plurality of ball bearings 133 may be arranged in a line along the Z-axis direction while being contact with both the third guide groove 113 of the base 100 and the guide surface 333 of the support 300.

The first and second plurality of ball bearings 131 and 133 may be each disposed between the base 100 and the support 300 to guide the support 300 in the Z-axis direction while minimizing friction between the base 100 and the support 300.

In this case, attraction occurs between a first magnet 213 disposed on the support 300 and a plate-shaped yoke 150 coupled to the base 100, and accordingly, one side of the support 300 is pulled toward the inner side of the base 100. A driver for auto focus adjustment operates in this state, and the support 300 may be stably moved along the Z-axis direction without shaking.

The base 100 has first to third coils 211, 221 and 231 disposed on three side surfaces of the base 100, respectively. Here, the first coil 211 is a part of the driver for auto focus adjustment, the second coil 221 is a part of a first driver for optical image stabilization, and the third coil 231 is a part of a second driver for optical image stabilization.

Together with the first magnet 213 (see FIG. 2), the first coil 211 forms the driver for auto focus adjustment to move the support 300 along the Z-axis direction for auto focus. Here, the first coil 211 is mounted on a first printed circuit board 217 installed on the base 100, and the first magnet 213 is disposed on one side of the support 300. In this case, a first shielding member 216 in a plate shape is disposed between the first magnet 213 and the support 300, while being coupled to the support 300. The first shielding member 216 prevents the driver for auto focus adjustment from being affected by electromagnetic fields generated from the first and second drivers for optical image stabilization.

The driver for auto focus adjustment moves the support through interaction with the first magnet 213 in a +Z-axis direction or in a -Z-axis direction depending on a direction (one direction and the reverse direction) of a current applied to the first coil 211. When the support 300 is placed in the inner space of the base 100, the first magnet 213 faces the first coil 211 at a predetermined distance.

The first coil 211 may be electrically connected to the first printed circuit board 217 installed on the base 100. The first printed circuit board 217 includes a plurality of terminals 219 for receiving power and control signals from the outside. The first printed circuit board 217 may have a first hall sensor 215 mounted thereon.

The first hall sensor 215 is disposed to be surrounded by the first coil 211 formed as a closed curve to detect a movement of the first magnet 213 and transmit a detected signal to a controller (not shown) of the small electronic device. The controller performs a control of the support in the Z-axis direction through the first hall sensor 215 and the driver for auto focus adjustment.

The second coil 221 may be mounted on a second printed circuit board 227 installed on the base 100. Together with a second magnet 223 (see FIG. 3), the second coil 221 forms the first driver for optical image stabilization to move the lens unit 500 in an X-axis direction for optical image stabilization. The first driver for optical image stabilization moves the lens unit 500 through interaction with the second magnet 223 in a +X-axis direction or in a -X-axis direction depending on a direction of a current applied to the second coil 221.

The second coil 221 may be electrically connected to the second printed circuit board 227 installed on the base 100. The second magnet 223 is disposed on one side of the lens unit 500 (see FIG. 3). In this case, a second shielding member 226 in a plate shape is disposed between the second magnet 223 and the lens unit 500, while being coupled to the lens unit 500. The second shielding member 226 prevents the first driver for optical image stabilization from being affected by electromagnetic fields generated from the driver for auto focus adjustment and the second driver for optical image stabilization.

When the lens unit 500 is disposed in the inner space of the base 100 together with the support 300, the second magnet 223 faces the second coil 221 at a predetermined distance.

The second printed circuit board 227 includes a plurality of terminals 229 for receiving power and control signals from the outside. The second printed circuit board 227 may have a second hall sensor 225 mounted thereon. The second hall sensor 225 is located inside the second coil 221 having a closed curve shape to detect a movement of the second magnet 223 and transmit a detected signal to the controller of the small electronic device. The controller performs a control of the lens unit 500 in the X-axis direction through the second hall sensor 225 of the second printed circuit board 227 and the first driver for optical image stabilization.

The third coil 231 may be mounted on a third printed circuit board 237 installed on the base 100. Together with a third magnet 233 (see FIG. 2), the third coil 231 forms the second driver for optical image stabilization to move the lens unit in a Y-axis direction for optical image stabilization. The second driver for optical image stabilization moves the lens unit through interaction with the third magnet 233 in a +Y-axis direction or in a -Y-axis direction depending on a direction of a current applied to the third coil 231.

The third coil 231 may be electrically connected to the third printed circuit board 237 installed on the base 100. The third magnet 233 is disposed on another side of the lens unit 500. In this case, a third shielding member 236 in a plate shape is disposed between the third magnet 233 and the lens unit 500, while being coupled to the lens unit 500. The third shielding member 236 prevents the second driver for optical image stabilization from being affected by electromagnetic fields generated from the driver for auto focus adjustment and the first driver for optical image stabilization.

When the lens unit 500 is disposed in the inner space of the base 100 together with the support 300, the third magnet 233 faces the third coil 231 at a predetermined distance.

The third printed circuit board 237 includes a plurality of terminals 239 for receiving power and control signals from the outside. The third printed circuit board 237 may have a third hall sensor 235 mounted thereon. The third hall sensor 235 is located inside the third coil 231 having a closed curve shape to detect a movement of the third magnet 233 and transmit a detected signal to the controller of the small electronic device. The controller performs a control of the lens unit in the Y-axis direction through the third hall sensor 235 of the third printed circuit board 237 and the second driver for optical image stabilization.

The first and second drivers for optical image stabilization described above may correct a position of the lens part 510 from hand shaking by moving the lens unit 100 in the X-axis and Y-axis directions. The lens unit 500 is moved in the X-axis direction by the first driver for optical image stabilization and is moved in the Y-axis direction by the second driver for optical image stabilization. As a result, the lens unit 500 is connected to the support 300 in a movable manner through a plurality of connection members 401, 402, 403 and 404, which will be described below. Accordingly, the lens unit 500 may be moved to any one position on the X-Y plane while being supported by the support 300.

The support 300 has a second light passage hole 301 formed therethrough (see FIG. 2). When the support 300 is inserted into the inner space of the base 100, the second light passage hole 301 corresponds to the first light passage hole 101 (see FIG. 2) of the base 100.

Figure 7:
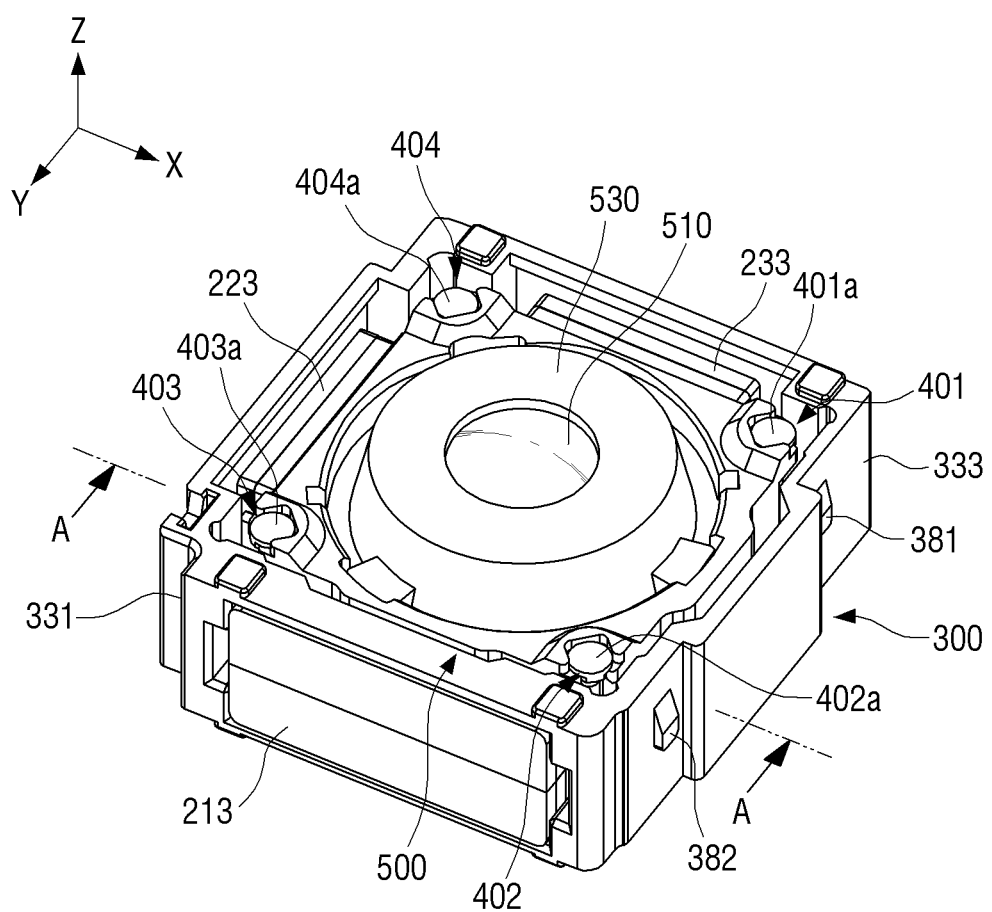
FIGS. 7 and 8 are assembled perspective views of the support and the lens unit that are movably connected to each other through a plurality of connection members.
Figure 8:
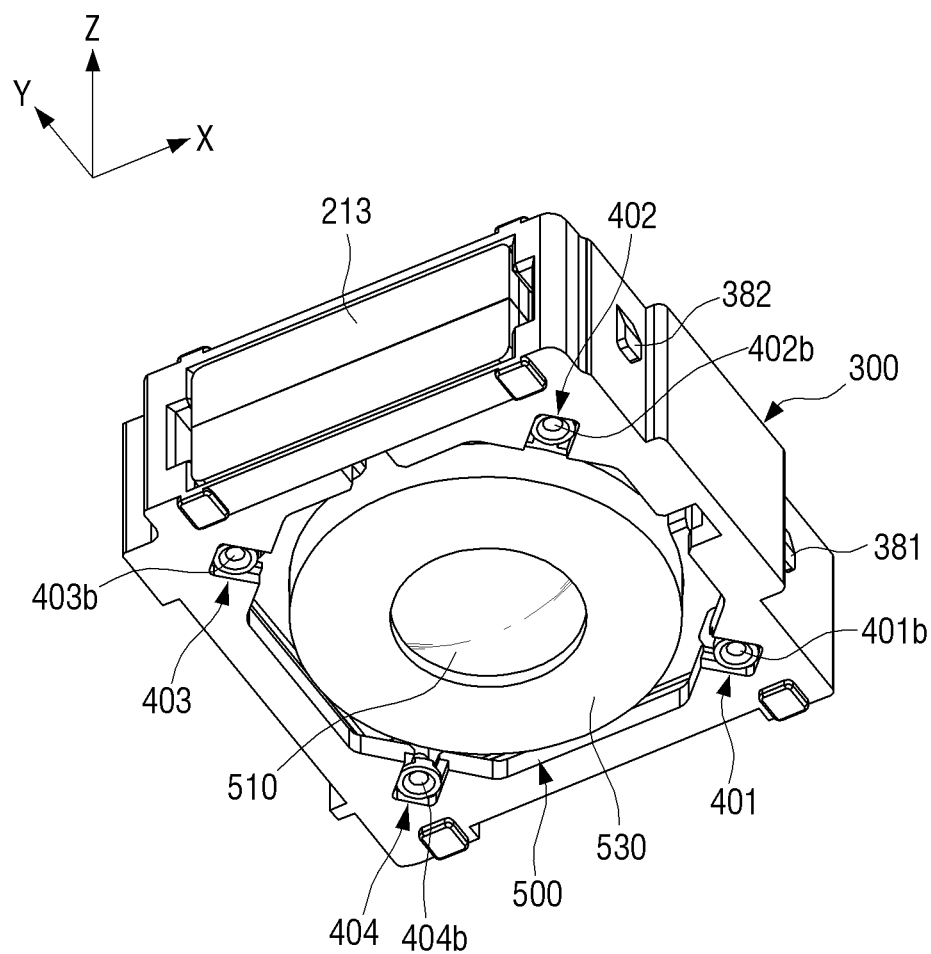

FIGS. 7 and 8 are assembled perspective views of the support and the lens unit that are movably connected to each other through the plurality of connection members.

Referring to FIGS. 7 and 8, the lens unit 500 is movably disposed to be moved along the X-Y plane with respect to the support 300 through the first to fourth connection members 401, 402, 403 and 404 while being inserted into the support 300 so as to implement the optical image stabilizing function.

The lens unit 500 serves to move the lens part 510 on the X-Y plane for optical image stabilization. The lens unit 500 includes a body 550 movably disposed in the support 300, a lens barrel 530, and the lens part 510.

The lens part 510 may include a plurality of lenses arranged at intervals along an optical axis inside the lens barrel 530.

The lens barrel 530 may pass through the body 550 in an optical axis direction to be coupled thereto. In this case, in order to fix the lens barrel 530 to the body 550 in a coupled state, an adhesive may be applied between the lens barrel 530 and the body 550 for the lens barrel 530 and the body 550 to stick to each other.

In addition, the lens barrel 530 may be coupled to the body 550 in a pressed state or in a screw fastening manner without using an adhesive.

The inner cover 600 serves to prevent the lens unit 500 inserted into the support 300 from escaping from the support 300.

The inner cover 600 is detachably coupled to the support 300 to partially cover an opening of the support 300 for inserting the lens unit 500 into the support 300. In this case, the inner cover 600 includes a plurality of couplers 611, 612 and 613 that are snap-coupled to a plurality of coupling protrusions 381, 382 and 383 formed on an outer surface of the support 300.

The inner cover 600 is seated on the perimeter of the opening of the support 300, and accordingly, the inner cover 600 is spaced apart from an upper surface of the lens unit 500 at a predetermined distance, and the lens unit 500 is prevented from being in contact with the inner cover 600 when moved in the X-axis and Y-axis directions.

The inner cover 600 has a third light passage hole 601 formed therethrough to allow an upper portion of the lens barrel 530 to be exposed.

The outer cover 700 is coupled to the base 100 and covers the inner cover 600. The outer cover 700 also has a fourth light passage hole 701 formed therethrough to allow the upper portion of the lens barrel 530 to be exposed. The outer cover 700 may be formed a metal material capable of shielding electromagnetic waves.

Hereinafter, referring to FIGS. 9 to 12, the plurality of connection members 401, 402, 403 and 404 connecting the support 300 and the lens unit 500 to each other will be described.

Figure 9:
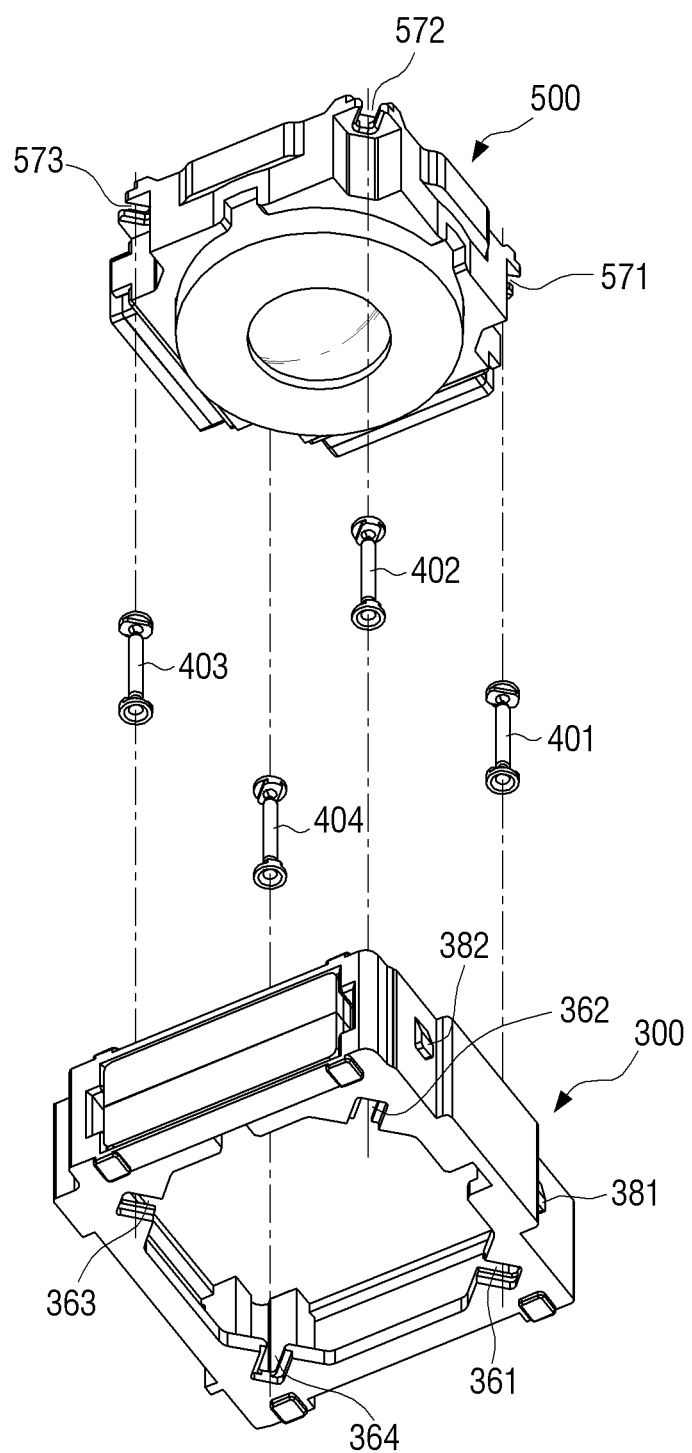
FIG. 9 is an exploded perspective view illustrating the support, the lens unit, and the plurality of connection members.
Figure 10:
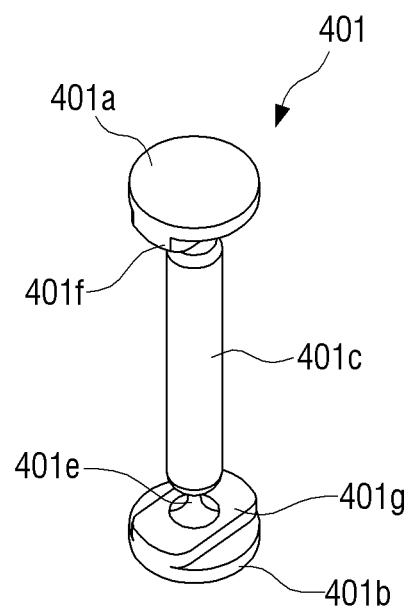
FIGS. 10 and 11 are a perspective view and a front view illustrating the connection members.
Figure 11:
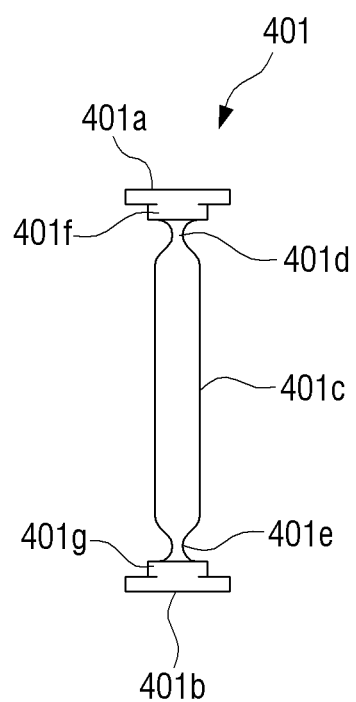
Figure 12:
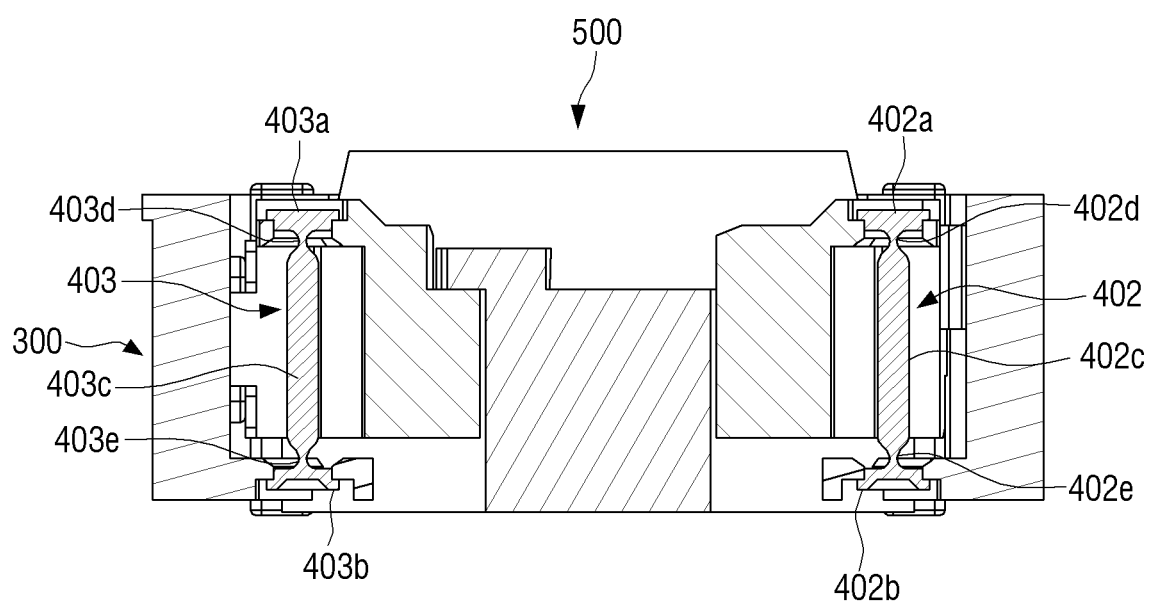
FIG. 12 is a cross-sectional view taken along line A-A of FIG. 7.

FIG. 9 is an exploded perspective view illustrating the support, the lens unit, and the plurality of connection members, FIGS. 10 and 11 are a perspective view and a front view illustrating the connection members, and FIG. 12 is a cross-sectional view taken along line A-A of FIG. 7.

Referring to FIG. 9, the plurality of connection members 401, 402, 403 and 404 connect the support 300 and the lens unit 500, which is inserted into the support 300, to each other. In this case, the plurality of connection members 401, 402, 403 and 404 support the lens unit 500 to be movable in the X-axis and Y-axes directions with respect to the support 300.

Referring to FIG. 12, the first to fourth connection members 401, 402, 403 and 404 have lower ends inserted into and fixed to first to fourth coupling grooves 361, 362, 363 and 364 formed at respective corners of an inner lower portion of the support 300, and upper ends inserted into and fixed to fifth to eighth coupling grooves 571, 572, 573 and 574 formed at respective corners of an outer upper portion of the lens unit 500.

The first to fourth connection members 401, 402, 403 and 404 may be formed of an elastic material to revert to their original positions when the first and second drivers for optical image stabilization do not operate after the first to fourth connection members 401, 402, 403 and 404 are moved to any one point on the X-Y plane by the first and second drivers for optical image stabilization.

Specifically, the first to fourth connection members 401, 402, 403 and 404 are preferably formed of a synthetic resin material that is non-conductive and has excellent durability (e.g., a thermoplastic elastomer (TPE)). In addition, the first to fourth connection members 401, 402, 403 and 404 are manufactured through injection molding, and thus may be formed in various shapes.

All of the first to fourth connection members 401, 402, 403 and 404 may have the same shape. For specific configurations of the first to fourth connection members 401, 402, 403 and 404, only the first connection member 401 will thus be described.

Referring to FIGS. 10 and 11, the first connection member 401 may include a pillar portion 401c having a predetermined length and thickness, an upper end portion 401a and a lower end portion 401b disposed at an upper end and at a lower end, respectively, of the pillar portion 401c, a first connection portion 401d formed between the pillar portion 401c and the upper end portion 401a, and a second connection portion 401e formed between the pillar portion 401c and the lower end portion 401b.

The upper end portion 401a has a first coupled portion 401f to be inserted into the fifth coupling groove 571, and the lower end portion 401b has a second coupled portion 401g to be inserted into the first coupling groove 361.

In order to prevent the first coupled portion 401f from being escaping from the fifth coupling groove 571, the first coupled portion 401f may be fixed into the fifth coupling groove 571 by an adhesive or by being coupled to the fifth coupling groove 571 in a pressed state without an adhesive.

Like the first coupled portion 401f, the second coupled portion 401g may also be fixed into the first coupling groove 361 by an adhesive or by being coupled to the first coupling groove 361 in a pressed state without an adhesive.

The first and second connection portions 401d and 401e are formed to be thinner than the pillar portion 401c. Accordingly, the first and second connection portions 401d and 401e serve as hinges by being bent at a predetermined angle between the upper end portion 401a and the pillar portion 401c and between the lower end portion 401b and the pillar portion 401c. The lens unit 500 may be smoothly be moved in the X-axis and Y-axis directions by the first and second connection portions 401d and 401e when the first and second drivers for optical image stabilization operate. In addition, the first and second connection portions 401d and 401e revert to their original shapes due to elastic forces when the power supply to the first and second drivers for optical image stabilization is cut off.

Furthermore, the plurality of connection members 401, 402, 403 and 404 are formed of a thermoplastic elastomer, which is a synthetic resin material having excellent elasticity and flexibility, and accordingly, the first and second connection portions, which are thinner than the pillar portion, are not broken, thereby improving product reliability.

In FIG. 12, unexplained reference numerals 402a and 403a denote upper end portions, 402b and 403b denote lower end portions, 402c and 403c denote pillar portions, 402d and 403d denote first connection portions, and 402e and 403e denote second connection portions.

Figure 13:
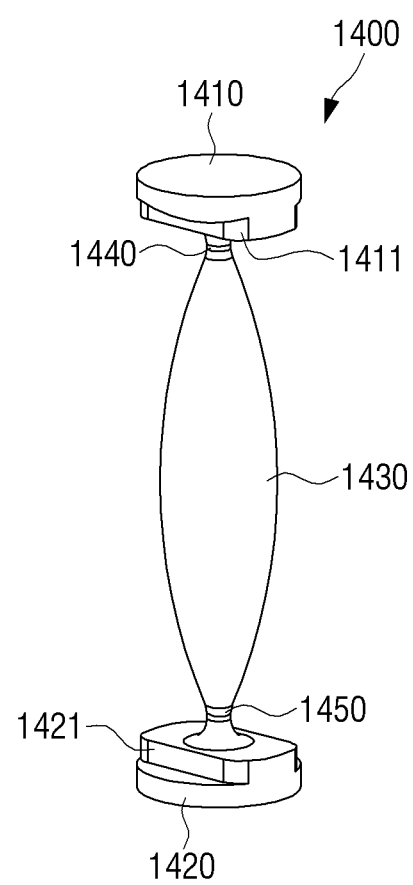
FIG. 13 is a perspective view illustrating another example of the connection member.

The pillar portions of the plurality of connection members 401, 402, 403 and 404 have been described above as having a generally cylindrical shape, but are not limited thereto and may have a shape different from the cylindrical shape as illustrated in FIG. 13.

FIG. 13 is a perspective view illustrating another example of the connection member.

Referring to FIG. 13, the connection member 1400 may include an upper end portion 1410 having a first coupled portion 1411, a lower end portion 1420 having a second coupled portion 1421, a pillar portion 1430, a first connection portion 1440 formed between the upper end portion and the pillar portion, and a second connection portion 1450 formed between the lower end portion and the pillar portion, in the same manner as the connection member 401 described above.

The pillar portion 1430 may be formed in such a shape that a diameter thereof gradually increases from upper and lower ends of the pillar portion toward the center, and thus, a middle portion of the pillar portion is convex overall. Accordingly, the pillar portion 1430 may have a generally elliptical longitudinal section and a generally circular cross section.

The connection member 1400 may be formed of the same material as the connection member 401 described above. Accordingly, the connection member 1400 may have both elasticity and ductility, like the connection member 401.

Meanwhile, the connection member 401 having the cylindrical pillar portion 401c described above may be bent due to its own ductility when the lens unit 500 applied is heavy. In this case, if the connection member 1400 having the convex pillar portion 1430, which has a greater strength than the cylindrical pillar portion 401c, is applied, it is possible to prevent the pillar portion 1430 from being bent.

Although preferred embodiments of the disclosure have been illustrated and described hereinabove, the disclosure is not limited to the particular embodiments described above, but may be variously modified by those skilled in the art to which the disclosure pertains without departing from the gist of the disclosure as claimed in the appended claims. These modifications should not be separately understood from the technical spirit and prospect of the disclosure.

INDUSTRIAL APPLICABILITY

The disclosure relates to a micro lens assembly having an auto focus function and an optical image stabilizing function.

The invention claimed is:

1. A lens assembly comprising:
   a base;
   a support inserted into the base to be movable in an optical axis direction;
   a driver for auto focus adjustment configured to move the support in the optical axis direction;
   a lens unit inserted into the support to be movable in a direction perpendicular to the optical axis direction and including a lens barrel to which a lens part is coupled;
   a driver for optical image stabilization configured to move the lens unit in the direction perpendicular to the optical axis direction;
   a plurality of ball bearings arranged between the support and the base for the support to be movable with respect to the base in the optical axis direction; and
   a plurality of connection members configured to connect the lens unit and the support to each other for the lens unit to be movable with respect to the support, and formed of an elastic nonconductor,
   wherein the plurality of connection members include first to fourth connection members, and
   one ends of the first to fourth connection members are coupled to first to fourth coupling grooves formed at four corner portions of the support, respectively, the other ends of the first to fourth connection members are coupled to fifth to eighth coupling grooves formed at four corner portions of the lens unit, respectively, and pillar portions of the first to fourth connection members are disposed between the one ends and the other ends.

2. The lens assembly as claimed in claim 1, wherein each of the plurality of connection members has one end fixed to the support and the other end fixed to the lens unit, and
   each of the plurality of connection members includes at least two bendable portions.

3. The lens assembly as claimed in claim 1, wherein the plurality of connection members are formed of a synthetic resin material.

4. The lens assembly as claimed in claim 1, wherein a material of the plurality of connection members is a thermoplastic elastomer (TPE).

5. The lens assembly as claimed in claim 1, wherein each of the first to fourth connection members includes:
   a first connection portion located at a portion where the one end and the pillar portion are connected to each other; and
   a second connection portion located at a portion where the other end and the pillar portion are connected to each other,
   the first and second connection portions being formed to be thinner than the pillar portion to serve as hinges.

6. The lens assembly as claimed in claim 5, wherein the pillar portion is formed to be gradually thicker from both ends toward a middle portion thereof.

7. The lens assembly as claimed in claim 6, wherein the pillar portion has an elliptical longitudinal section.

8. The lens assembly as claimed in claim 1, wherein the one ends of the first to fourth connection members are fixed to the first to fourth coupling grooves, respectively, by an adhesive, and
   the other ends of the fifth to eighth connection members are fixed to the fifth to eighth coupling grooves, respectively, by an adhesive.

9. The lens assembly as claimed in claim 1, wherein the one ends of the first to fourth connection members include coupled portions pressed against and coupled to the first to fourth coupling grooves, respectively, and
   the other ends of the fifth to eighth connection members include coupled portions pressed against and coupled to the fifth to eighth coupling grooves, respectively.

* * * * *